(12) United States Patent
Kawamura et al.

(10) Patent No.: US 12,128,305 B2
(45) Date of Patent: Oct. 29, 2024

(54) INFORMATION PROCESSING DEVICE AND IMAGE GENERATION METHOD

(71) Applicant: SONY INTERACTIVE ENTERTAINMENT INC., Tokyo (JP)

(72) Inventors: Daisuke Kawamura, Foster City, CA (US); Yasuyuki Suki, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 558 days.

(21) Appl. No.: 17/421,555

(22) PCT Filed: Oct. 7, 2019

(86) PCT No.: PCT/JP2019/039511
§ 371 (c)(1),
(2) Date: Jul. 8, 2021

(87) PCT Pub. No.: WO2020/148949
PCT Pub. Date: Jul. 23, 2020

(65) Prior Publication Data
US 2022/0258051 A1    Aug. 18, 2022

(30) Foreign Application Priority Data

Jan. 18, 2019   (JP) ................................. 2019-006990

(51) Int. Cl.
*G06F 3/04815* (2022.01)
*A63F 13/49* (2014.01)
(Continued)

(52) U.S. Cl.
CPC ............ *A63F 13/533* (2014.09); *A63F 13/49* (2014.09); *G06F 3/04815* (2013.01);
(Continued)

(58) Field of Classification Search
CPC ..................... G06T 11/60; G06T 11/00; G06T 2207/10016; G06T 7/90; G06T 2200/24;
(Continued)

(56) References Cited

U.S. PATENT DOCUMENTS 9,083,850 B1 *   7/2015   Higgs ..................... H04N 7/147
10,534,503 B1 *  1/2020   Grundmann .......... G06F 3/0482
(Continued)

FOREIGN PATENT DOCUMENTS

CN      104756124 A    7/2015
JP      5-80963 A      4/1993
(Continued)

OTHER PUBLICATIONS

Adding Even more Life to Live Photos, J. D. Biersdorfer, Dec. 26, 2017.*

(Continued)

*Primary Examiner* — Rayeez R Chowdhury
(74) *Attorney, Agent, or Firm* — XSENSUS LLP

(57) ABSTRACT

A game image generation unit 112 generates a moving image of content. A receiving unit 104 receives a displayed image changing request. Upon reception of the changing request by the receiving unit 104, a display control unit 106 acquires information regarding a frame image of the content from the frame buffer 108. A system image generation unit 120 uses the information regarding the frame image to generate an image that differs from the frame image. The display control unit 106 acquires information regarding an end frame image of the content or an image preceding the end frame image by a predetermined number of frames.

17 Claims, 9 Drawing Sheets

(51) Int. Cl.
*A63F 13/533* (2014.01)
*G06F 3/04817* (2022.01)
*G06F 3/0482* (2013.01)
*G06F 3/04845* (2022.01)

(52) U.S. Cl.
CPC ........ *G06F 3/04817* (2013.01); *G06F 3/0482* (2013.01); *G06F 3/04845* (2013.01); *A63F 2300/308* (2013.01)

(58) Field of Classification Search
CPC ......... G06T 9/00; G06T 13/00; G06T 15/503; G06T 19/20; G06T 2207/10024; G06T 1/00; G06T 2207/30004; G06T 7/0012; G06T 19/006; G06T 2207/10004; G06T 7/246; G06T 1/20; G06T 11/001; G06T 13/80; G06T 2207/30241; G06F 3/04845; G06F 3/04815; G06F 3/04817; G06F 3/0482; G06F 2203/04806; G06F 3/0481; G06F 18/23213; G06F 18/253
See application file for complete search history.

(56) References Cited

U.S. PATENT DOCUMENTS

| | | | | |
|---|---|---|---|---|
| 2004/0037468 A1* | 2/2004 | Morishima | .......... | G02B 21/367 382/218 |
| 2007/0139408 A1* | 6/2007 | Keranen | ................ | G06T 15/50 345/426 |
| 2008/0320546 A1* | 12/2008 | Moon | .............. | H04N 21/44008 725/136 |
| 2009/0251423 A1* | 10/2009 | Jung | .................... | H03K 17/945 345/173 |
| 2011/0107220 A1* | 5/2011 | Perlman | ............. | H04N 21/2381 715/720 |
| 2011/0208790 A1* | 8/2011 | Sakata | ................... | G06Q 30/02 707/812 |
| 2012/0105681 A1* | 5/2012 | Morales | .................... | G06T 5/90 382/167 |
| 2014/0292803 A1* | 10/2014 | Cook | ...................... | G06T 15/00 345/619 |
| 2015/0058893 A1* | 2/2015 | Hong | .................... | G06F 3/0346 725/47 |
| 2015/0258432 A1* | 9/2015 | Stafford | ................ | A63F 13/426 463/32 |
| 2022/0258051 A1* | 8/2022 | Kawamura | ........... | G06F 3/0482 |

FOREIGN PATENT DOCUMENTS

| | | |
|---|---|---|
| JP | H0580963 A | 4/1993 |
| JP | H1027082 A | 1/1998 |
| JP | H11232438 A | 8/1999 |
| JP | 11-313229 A | 11/1999 |
| JP | 2002077329 A | 3/2002 |
| JP | 2004120544 A | 4/2004 |
| JP | 2004214749 A | 7/2004 |
| JP | 2004342048 A | 12/2004 |
| JP | 2005-312972 A | 11/2005 |
| JP | 2005-341169 A | 12/2005 |
| JP | 2009-112550 A | 5/2009 |
| JP | 2009525653 A | 7/2009 |
| JP | 2010009459 A | 1/2010 |
| JP | 2012-129697 A | 7/2012 |
| JP | 2013005489 A | 1/2013 |
| JP | 2014203318 A | 10/2014 |
| JP | 2014-236866 A | 12/2014 |
| JP | 2017090790 A | 5/2017 |
| JP | 2017173990 A | 9/2017 |
| WO | 2005026933 A1 | 3/2005 |

OTHER PUBLICATIONS

International Search Report and Written Opinion mailed Dec. 24, 2019, from PCT/JP2019/039511, 21 sheets.
International Preliminary Report on Patentability mailed Jul. 29, 2021, from PCT/JP2019/039511, 20 sheets.
Reconsideration Report by Examiner before Appeal drafted Apr. 3, 2023, from Japanese Patent Application No. 2020-566102, 2 sheets.
The extended European search report dated Nov. 8, 2022, from European Patent Application No. 19910116.3, 13 sheets.
Thatimster:"How to make a Blurred Pause Menu in BGE", Nov. 6, 2016 (Nov. 6, 2016), XP055973948, Retrieved from the Internet: URL:https://www.youtube.com/watch?v=FbROTo3BW7s [retrieved on Oct. 24, 2022] * 0:00-0:15 * 5:00-5:15 * 9:45-10:15 * 11:00-11:15 *, 2 sheets.
Notice of Reasons for Refusal dated Jul. 5, 2022, from Japanese Patent Application No. 2020-566102, 4 sheets.
Office Action issued Feb. 4, 2024 in Chinese Patent Application No. 201980088545.3, 18 pages.

* cited by examiner

INFORMATION PROCESSING DEVICE AND IMAGE GENERATION METHOD

TECHNICAL FIELD

The present invention relates to a technique for generating an image.

BACKGROUND ART

PTL 1 discloses a game machine that is manipulated through a dedicated game controller. The game controller includes a plurality of buttons and, when a user presses down a predetermined button while a game image is displayed, the game machine hides the game image to display a menu image instead on a display.

The user may suspend a game play to display the menu image on the display. In a case where the user checks messages from friends or transmits a message to a friend, for instance, the user switches from a game image to the menu image and selects a menu item regarding the message, so that a message image is displayed. After the user finishes what is to be done, the user promptly redisplays the game image to resume the game play.

CITATION LIST

Patent Literature

[PTL 1]
JP 2014-236866A

SUMMARY

Technical Problem

A view of the world in content such as a game forms an important element for immersion of a user into the content. In conventional information processing devices, a switch from a content image to a menu image may pull the user from a virtual world back to a real world and may thus impair a sense of immersion into the content. Therefore, development of such a technique upon a switch from the content image to another image as to hand over the view of the world in the content to the image after the switch is demanded. In a case where a still image of a selected content is displayed as a background image in a menu image in which icons of a plurality of pieces of content are arranged, additionally, it is desirable that rendering for increase in concern of the user about the selected content should be given.

Solution to Problem

In order to solve the problem, an information processing device according to an aspect of the present invention includes a first image generation unit to generate a moving image of content, a receiving unit to receive a displayed image changing request, a display control unit to acquire information regarding a frame image of the content upon reception of the changing request by the receiving unit, and a second image generation unit to use the information regarding the frame image to generate an image that differs from the frame image.

Another aspect of the present invention is an image generation method including a step of generating a moving image of a piece of content, a step of receiving a displayed image changing request, a step of acquiring information regarding a frame image of the content upon reception of the changing request, and a step of using the information regarding the frame image of the content to generate an image that differs from the frame image.

Still another aspect of the present invention is an information processing device including an image generation unit to generate a content selection image in which icons of a plurality of pieces of content are arranged so as to be selectable by a user and in which a still image of a piece of content corresponding to an icon being selected is used as a background image, and a receiving unit to receive an icon changing manipulation. When the receiving unit receives the icon changing manipulation, the image generation unit generates an image different from a still image of a piece of content corresponding to a selected icon and generates a moving image that is to change into the still image after lapse of a predetermined time period from display of the different image.

Still another aspect of the present invention is an image generation method including a step of generating a content selection image in which icons of a plurality of pieces of content are arranged so as to be selectable by a user and in which a still image of a piece of content corresponding to an icon being selected is used as a background image, a step of receiving an icon changing manipulation, generating an image different from a still image of a content corresponding to a selected icon upon reception of the icon changing manipulation, and a step of generating a moving image that is to change into the still image after lapse of a predetermined time period from display of the different image.

In addition, any combination of above components and expression of the present invention converted among a method, a device, a system, a recording medium, a computer program, and the like are also effective as aspects of the present invention.

DESCRIPTION OF EMBODIMENT

Figure 1:
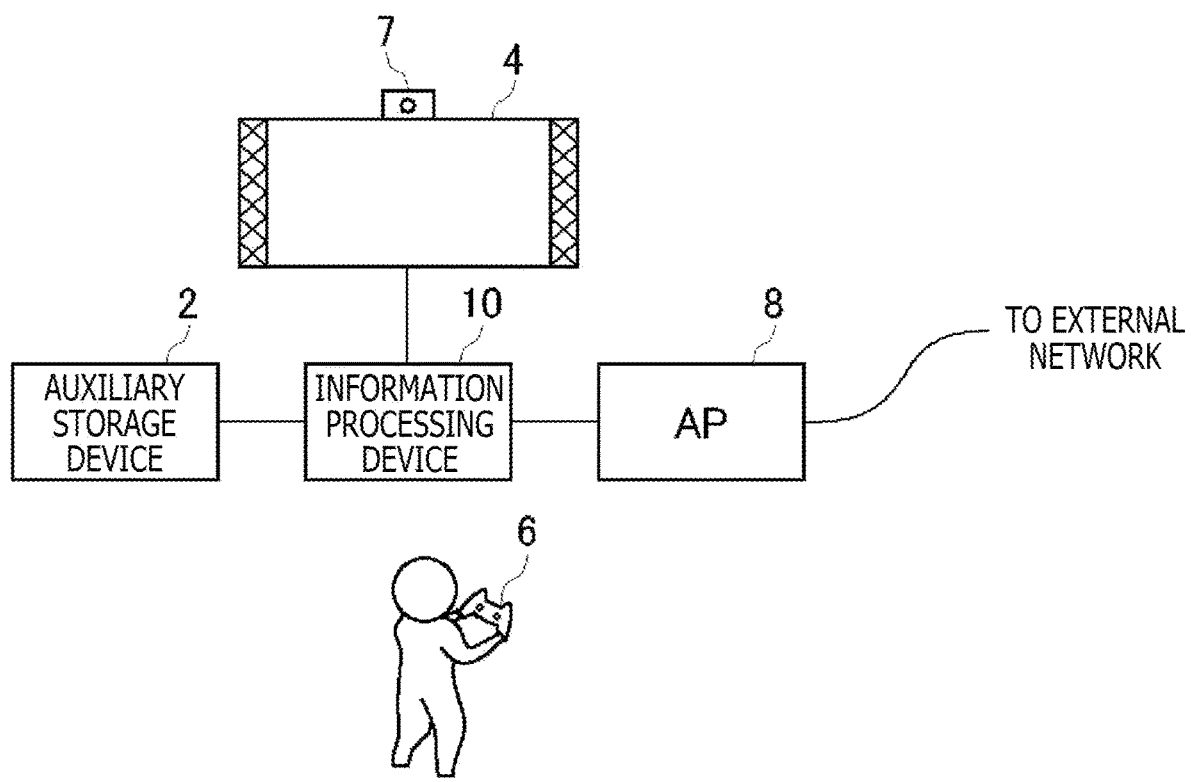
FIG. 1 is a diagram illustrating an information processing system in accordance with an embodiment.

FIG. 1 illustrates an information processing system 1 in accordance with an embodiment of the present invention. The information processing system 1 includes an auxiliary storage device 2, an output device 4, an input device 6, a camera 7, and an information processing device 10. The information processing device 10 may be connected via an access point (AP) 8 to an external network.

The input device 6 is connected to the information processing device 10 in a wireless or wired manner, receives manipulated input from a user, and supplies manipulation information to the information processing device 10. The information processing device 10 reflects the manipulation information received from the input device 6, on processing in system software or application software and makes the output device 4 output a result of the processing.

The information processing device 10 of the embodiment is a game machine to execute game software and the input device 6 may be equipment, such as a game controller, to supply the manipulation information from the user to the information processing device 10. The information processing device 10 may have a function of executing application software other than game software and may have a function of reproducing content such as a movie. The input device 6 includes a plurality of manipulation push buttons, an analog stick through which an analog quantity can be inputted, and a plurality of input units such as rotatable buttons.

The auxiliary storage device 2 is a mass-storage device such as an HDD (Hard Disk Drive) or a flash memory and may be an external storage device to be connected to the information processing device 10 via a USB (Universal Serial Bus) or the like or may be a built-in storage device. The output device 4 may be a television including a display to output images and a speaker to output audio. The output device 4 may be connected to the information processing device 10 via a wire cable or in a wireless manner. The camera 7 is a stereo camera to image a space around the output device 4.

Figure 2:
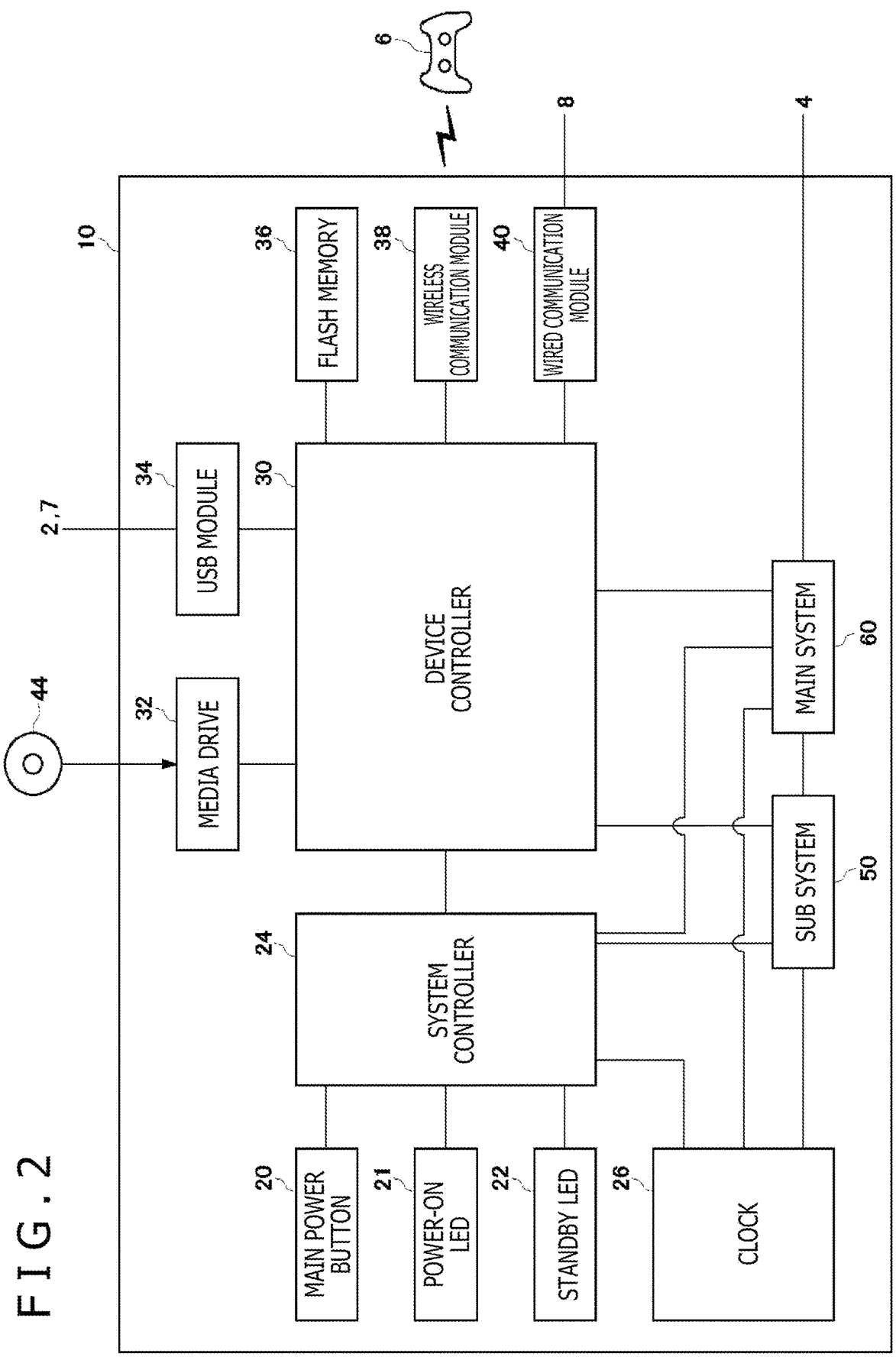
FIG. 2 is a diagram illustrating functional blocks for an information processing device.

FIG. 2 illustrates functional blocks for the information processing device 10. The information processing device 10 includes a main power button 20, a power-on LED (light emitting diode) 21, a standby LED 22, a system controller 24, a clock 26, a device controller 30, a media drive 32, a USB module 34, a flash memory 36, a wireless communication module 38, a wired communication module 40, a sub system 50, and a main system 60.

The main system 60 includes a main CPU (Central Processing Unit), a memory that is a main storage device, a memory controller, a GPU (Graphics Processing Unit), and the like. The GPU is used mainly for arithmetic processing in a game program. These functions may be implemented as a system-on-a-chip formed on a single chip. The main CPU has a function of executing game programs recorded in the auxiliary storage device 2 or a ROM (read-only memory) medium 44.

The sub system 50 includes a sub CPU, a memory that is a main storage device, a memory controller, and the like, includes no GPU, and has no function of executing a game program. The number of circuit gates of the sub CPU is smaller than the number of circuit gates of the main CPU and an operating power consumption of the sub CPU is smaller than an operating power consumption of the main CPU. The sub CPU operates even while the main CPU is in a standby state, and processing functions of the sub CPU are restricted to keep the power consumption at a low level.

The main power button 20 is an input unit through which manipulated input is carried out by the user, is provided on a front face of a housing of the information processing device 10, and is manipulated to turn on or off power supply to the main system 60 of the information processing device 10. The power-on LED 21 is lighted when the main power button 20 is turned on and the standby LED 22 is lighted when the main power button 20 is turned off.

The system controller 24 detects pressing of the main power button 20 by the user. When the main power button 20 is pressed down with a main power supply being in an off state, the system controller 24 acquires such a pressing manipulation as an "on-instruction." When the main power button 20 is pressed down with the main power supply being in an on state, by contrast, the system controller 24 acquires such a pressing manipulation as an "off-instruction."

The clock 26 is a real-time clock to generate current date and time information and to supply the information to the system controller 24, the sub system 50, and the main system 60. The device controller 30 is configured as an LSI (Large-Scale Integrated Circuit), such as a southbridge, to carry out exchanges of information between devices. As illustrated, the device controller 30 is connected with devices such as the system controller 24, the media drive 32, the USB module 34, the flash memory 36, the wireless communication module 38, the wired communication module 40, the sub system 50, and the main system 60. The device controller 30 absorbs differences in electric characteristics, data transfer rates, and the like among the devices and controls timing of data transfer.

The media drive 32 is a drive device to load and drive a ROM medium 44 on which application software such as a game and license information are recorded and to read a program, data, and the like from the ROM medium 44. The ROM medium 44 may be a read-only recording medium such as an optical disc, a magneto-optical disk, or a Blu-ray disc.

The USB module 34 is a module to be connected to external equipment via USB cables. The USB module 34 may be connected to the auxiliary storage device 2 and the camera 7 via USB cables. The flash memory 36 is an auxiliary storage device to configure an internal storage. The wireless communication module 38 communicates wirelessly with the input device 6, for instance, in accordance with a communication protocol such as Bluetooth (registered trademark) protocol or IEEE 802.11 protocol. The wired communication module 40 communicates with external equipment in a wired manner and is connected to a network 3 via the AP 8.

Figure 3:
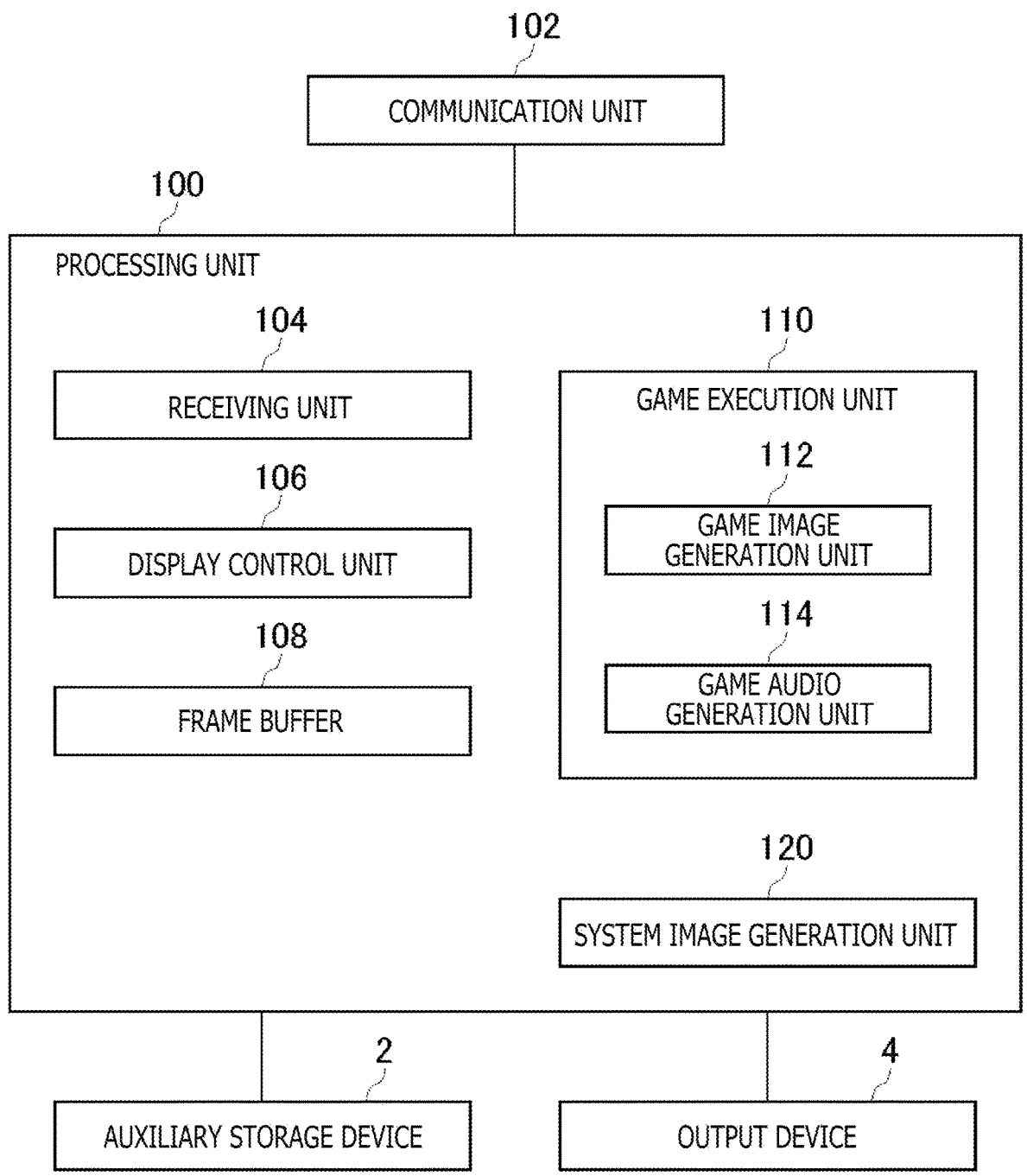
FIG. 3 is a diagram illustrating a configuration of the information processing device.

FIG. 3 illustrates a configuration of the information processing device 10. The information processing device 10 includes a processing unit 100 and a communication unit 102, and the processing unit 100 includes a receiving unit 104, a display control unit 106, a frame buffer 108, a game execution unit 110, and a system image generation unit 120. The game execution unit 110 has a function of executing game software and includes a game image generation unit 112 and a game audio generation unit 114. The game execution unit 110 may execute application software other than game software.

Each of elements illustrated as the functional blocks that carry out various processes in FIG. 3 may be implemented by a circuit block, a memory, or another LSI as hardware or may be implemented by system software, a game program loaded in a memory, or the like as software. Therefore, it is understood by those skilled in the art these functional blocks may be implemented in various forms by only hardware, only software, or a combination thereof and there is no limitation to any of the forms.

The communication unit 102 is expressed as a configuration having both functions of the wireless communication module 38 and the wired communication module 40 that are illustrated in FIG. 2. The communication unit 102 receives the manipulation information resulting from manipulation of the input units of the input device 6 by the user, and the receiving unit 104 receives the manipulation information. In the embodiment, the receiving unit 104 receives the manipulation information designating a displayed image changing request and supplies the manipulation information to the display control unit 106.

The game execution unit 110 executes game software. In the game execution unit 110, the game image generation unit 112 generates a moving image for a game, and the game audio generation unit 114 generates audio for the game. The game image generation unit 112 supplies game image data to the frame buffer 108, and the display control unit 106 makes the output device 4 output the game image data stored in the frame buffer 108. Meanwhile, the display control unit 106 has a function of making the output device 4 display the game image data generated by the game image generation unit 112 and system image data generated by the system image generation unit 120.

Figure 4:
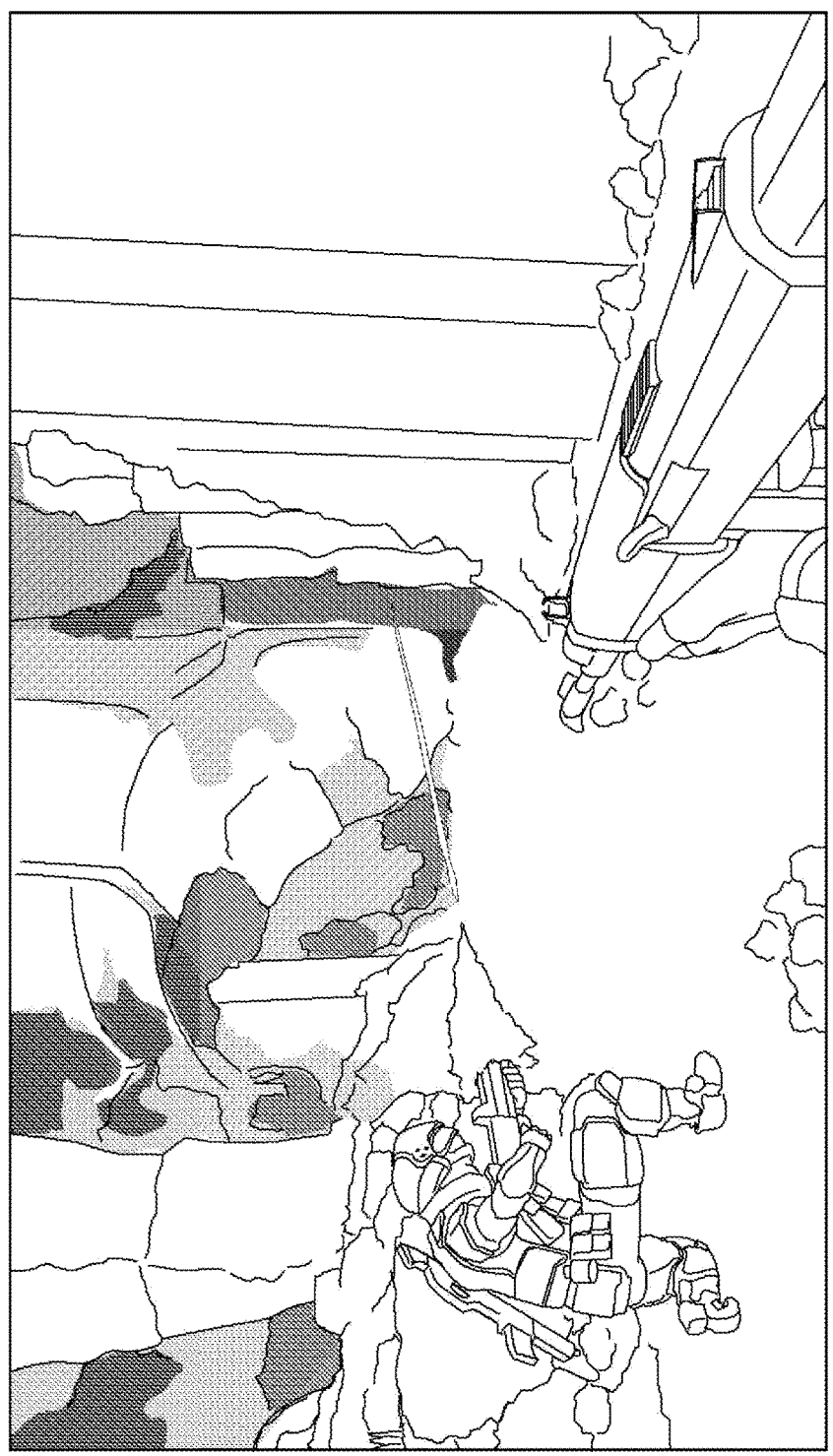
FIG. 4 is a diagram illustrating an example of a game image.

FIG. 4 illustrates an example of the game image displayed on the output device 4. In this example, an image of a first-person shooter (FPS) is displayed on the output device 4. The output device 4 of the embodiment may be a set-top display device such as a television, a portable display device such as a tablet, or a head-mounted display device.

A view of the world in a game includes various elements, among which a "color tone" of a video picture is an element that determines a visual atmosphere of the game and that is of high importance. A unified color tone throughout a game may make the user recognize that the color tone configures a tint of the world of the game and may bring about an effect of immersion into the game.

Upon manipulation of a predetermined button of the input device 6 by the user in a game play, the receiving unit 104 receives a displayed image changing request. Here, the displayed image changing request is a request to switch from a game image to a system image. Upon reception of the displayed image changing request by the receiving unit 104, the display control unit 106 instructs the game execution unit 110 to suspend a progression of the game and instructs the system image generation unit 120 to generate the system image. The system image may be a menu image including one or more menu items for manipulation of the information processing device 10.

Figure 5:
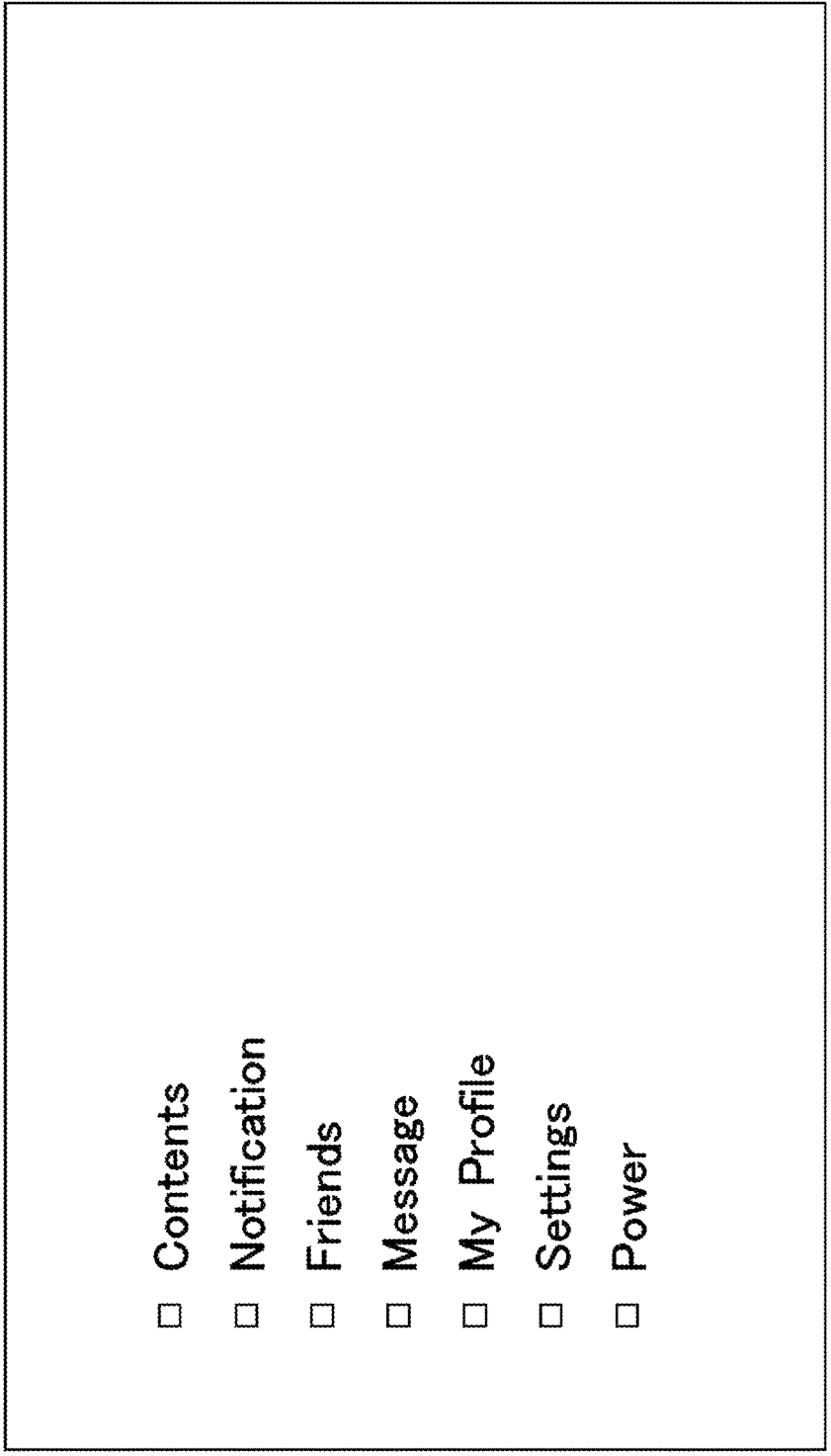
FIG. 5 illustrates an example of menu items included in a menu screen.

FIG. 5 illustrates an example of the menu items included in a menu screen. The menu screen includes a plurality of the menu items, and the user manipulates the input device 6 to select an intended menu item. For a purpose of browsing a received message, for instance, the user manipulates a determination button of the input device 6 with a cursor pointed to an item "Message," so that a browsing screen for message is displayed on the display.

In a case where the menu screen illustrated in FIG. 5 has a background of such a predetermined color as blue, for instance, the user may have a feeling of having been pulled back to a world completely separated from the world of the game. Thus, the user has to enter the world of the game afresh when resuming the game play; however, the user may keep a state of being immersed in the game, provided that the view of the world in the game is expressed in the menu screen as well.

Figure 6:
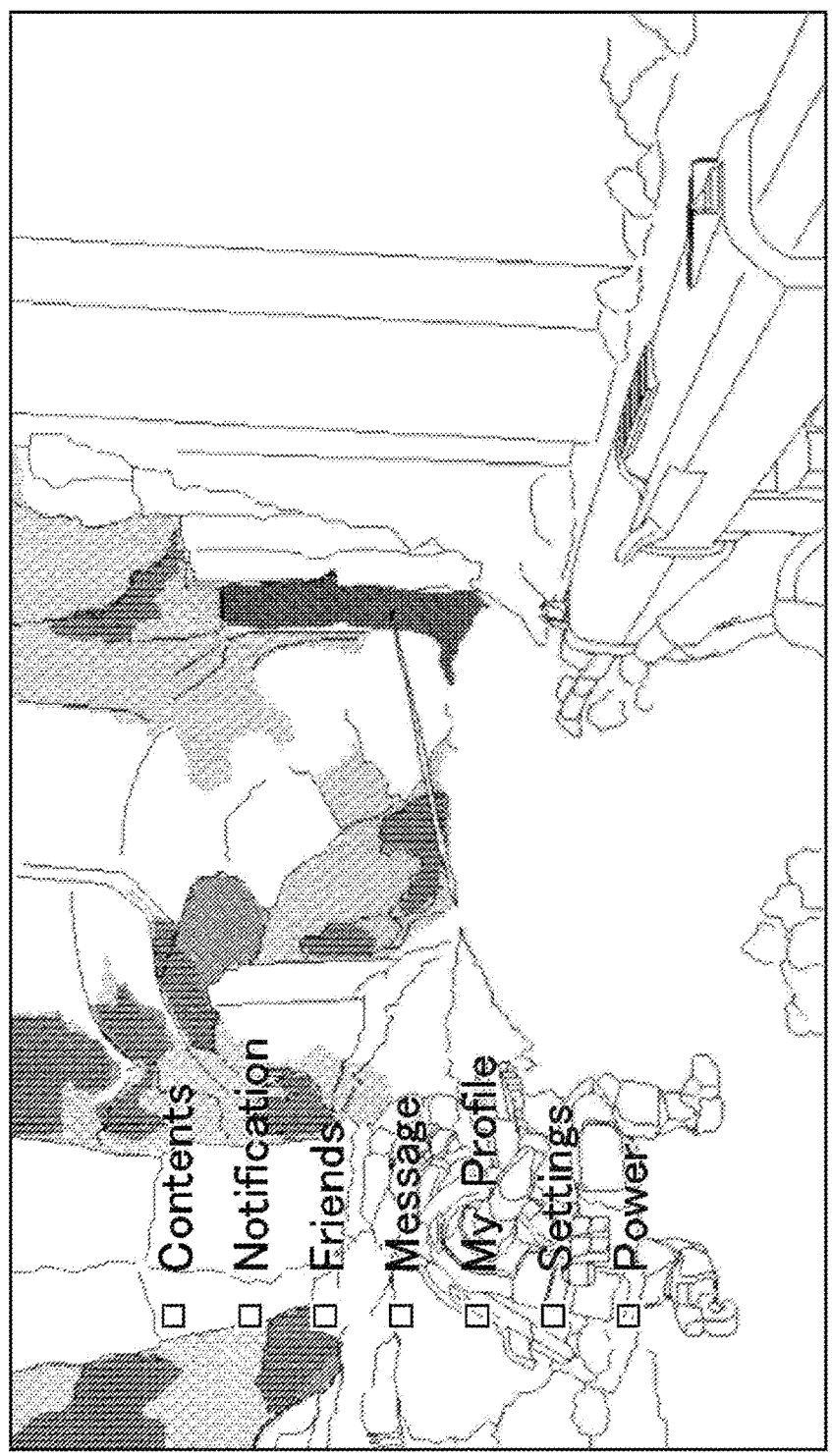
FIG. 6 is a diagram illustrating an example of a menu image in the embodiment.

FIG. 6 illustrates an example of the menu screen displayed on the output device 4 in the embodiment. When the user manipulates the predetermined button of the input device 6 in a game play and the receiving unit 104 then receives a displayed image changing request, the display control unit 106 acquires information regarding a frame image of the game. Here, the display control unit 106 acquires pixel information regarding the last frame image (end frame image) in game moving images from the frame buffer 108 and supplies the pixel information to the system image generation unit 120. The system image generation unit 120 uses the information regarding the frame image to generate an image that differs from the frame image.

In the embodiment, the system image generation unit 120 uses the information regarding the frame image of the game to generate a background image for the menu screen and generates the menu image in which at least one menu item is placed in front of the background image. Data of the menu image is supplied to the frame buffer 108, and the display control unit 106 makes the output device 4 display the menu image. Though the system image generation unit 120 may use the pixel information regarding the end frame image, the system image generation unit 120 may generate the background image for the menu screen by use of pixel information regarding an image preceding the end frame image by a predetermined number of frames, in order to ensure processing time for generation of the background image.

The system image generation unit 120 may use the pixel information regarding the frame images of the game to generate a moving image in accordance with a predetermined image generation program. In the example illustrated in FIG. 6, the system image generation unit 120 generates the background image for the menu screen through blur processing of a frame image of the game. Thus, a color tone of the game world is maintained in the menu screen. Note that the system image generation unit 120 may blur frame images of the game, while generating the blurred background image as a moving image. By setting the background image as the moving image, the user may be made to feel as if the world of the game is moving.

Note that, in theory, the game execution unit 110 can also generate the background moving image for the menu screen. A process of generating the moving image by the game execution unit 110, however, requires a large quantity of resources and thus may involve difficulty in terms of spec depending on processing power of the information processing device 10. In the embodiment, therefore, the system image generation unit 120 expresses the world of the game through the blur processing of one frame image of the game, so that the menu screen is generated under a light processing load.

The system image generation unit 120 may generate the moving image in which each pixel is randomly moved. For instance, the system image generation unit 120 may generate the background moving image by setting a moving velocity in accordance with a luminance of an aggregation of a plurality of pixels and by determining a moving direction of the aggregation of the plurality of pixels with use of random function. Such movement of the background image may provide the user with a feeling of manipulating the menu in the dynamic world of the game, while the user maintains the sense of immersion into the world of the game through the color tone of the background image.

Figure 7:
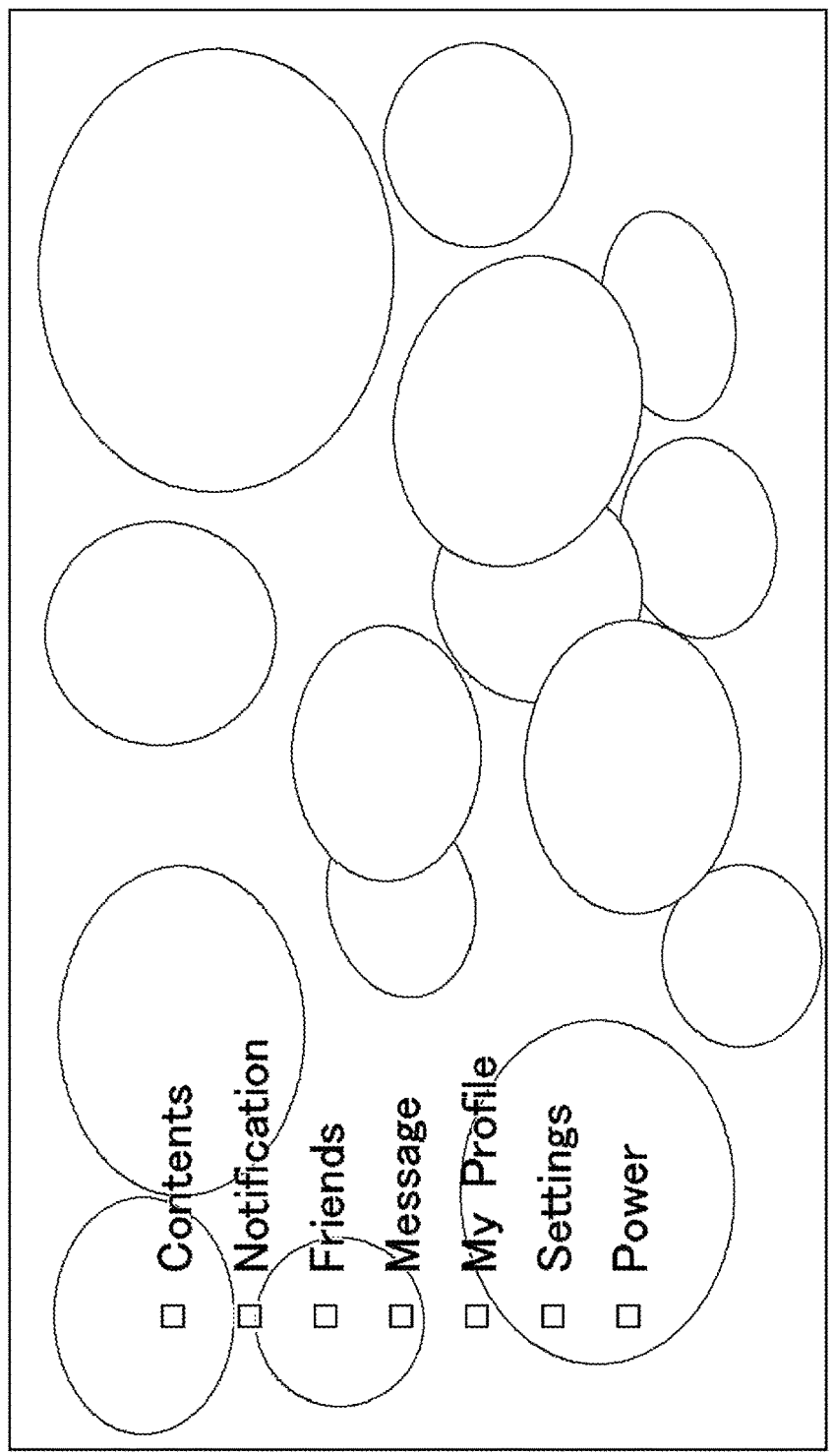
FIG. 7 is a diagram illustrating another example of a menu image in the embodiment.

FIG. 7 illustrates another example of the menu screen displayed on the output device 4. The system image generation unit 120 uses the pixel information regarding a frame image to generate a polka-dot background image. In this example, it is preferable that polka dots should be colored in accordance with pixel values used in the frame image and should be moved randomly. For instance, the system image generation unit 120 partitions the frame image with a plurality of grid lines that are horizontal and vertical and generates a circle, having a pixel value of each grid point, for each grid point. A size of each circle may be set randomly so as to be equal to or smaller than a predetermined upper limit and each circle may be a true circle or an ellipse. The plurality of polka dots may be made to express a color tone of the game world by coloring of the polka dots in accordance with the pixel values of respective grid points.

Note that the system image generation unit 120 may find a color tone of a frame image of the game and may determine colors of the polka dots so as to maintain the color tone. On condition that the color tone of the frame image is brown, for instance, the system image generation unit 120 may determine the colors of the polka dots such that brown polka dots may become dominant in number (or occupied area in the screen). Thus, the user may be made to feel the game world in the menu screen.

The present invention has been described above on the basis of the embodiment. The embodiment is an exemplification and it is to be understood by those skilled in the art that various modifications may be made to combinations of individual components or individual processes of the embodiment and that such modifications are still within the scope of the present invention.

In a modification, the receiving unit 104 receives a changing request from a first content moving image to a different second content moving image. Then, the system image generation unit 120 generates a moving image (link moving image) that links an end frame image of the first content moving image generated by the game image generation unit 112 and a start frame image of the second content moving image generated by the game image generation unit 112 in response to the changing request. The system image generation unit 120 may generate a start frame image of the link moving image with use of information regarding the end frame image of the first content moving image and may generate an end frame image of the link moving image with use of information regarding the start frame image of the second content moving image. A color tone of the link moving image may be controlled so as to continuously change from a color tone of the end frame image of the first content moving image to a color tone of the start frame image of the second content moving image.

Hereinbelow, another modification will be described. When the user manipulates the determination button of the input device 6 with the cursor pointed to an item "Content" in the menu screen illustrated in FIG. 6, for instance, a content selection screen is displayed on the display. The system image generation unit 120 may generate a content selection image in which a background image is temporarily made into a moving image, so that rendering for increase in concern of the user about the content may be given.

Figure 8:
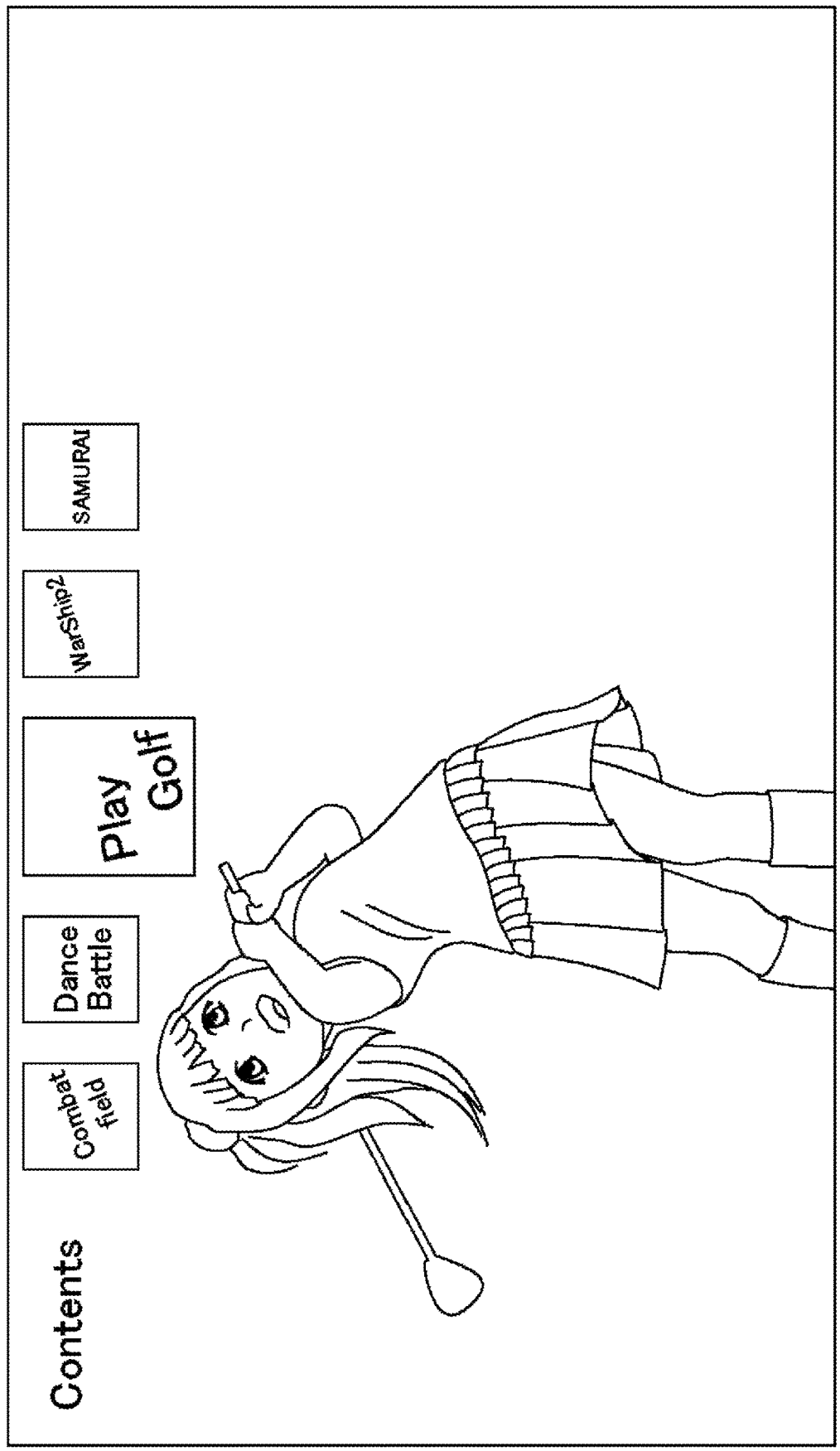
FIG. 8 is a diagram illustrating an example of a content selection image.

FIG. 8 illustrates an example of the content selection screen. The system image generation unit 120 arranges icons of a plurality of pieces of content such that the icons can be selected by the user, to generate the content selection image in which a still image of a piece of content corresponding to an icon being selected is used as a background image. The icons and still images of the pieces of content are stored for each piece of content in the auxiliary storage device 2.

In the example illustrated in FIG. 8, in which an icon of a title "PlayGolf" has been selected, the system image generation unit 120 generates the content selection image in which the icon of "PlayGolf" is set relatively large in size and in which a still image of "PlayGolf" is used as the background image, and the display control unit 106 makes the output device 4 display the content selection image. The still image may be a package image. The system image generation unit 120 arranges the icons of the plurality of pieces of content along one direction in front of the background image. In the example, the system image generation unit 120 arranges the icons of the plurality of pieces of content along a horizontal direction, and the third icon from left is in a selected state.

The user manipulates a right arrow key or a left arrow key of the input device 6 so as to move a row of the icons leftward or rightward and so as to place an icon of a desired piece of content at a third position from left. The user may move the row of the icons leftward or rightward by tipping an analog stick of the input device 6 rightward or leftward. The receiving unit 104 receives a manipulation of the input device 6 in a direction of arrangement of the icons, as an icon changing manipulation. When the receiving unit 104 receives a manipulation of the right arrow key as the icon changing manipulation, for instance, the whole row of the icons moves leftward, so that the icon of a title "WarShip2" is placed at the third position from the left.

Figure 9:
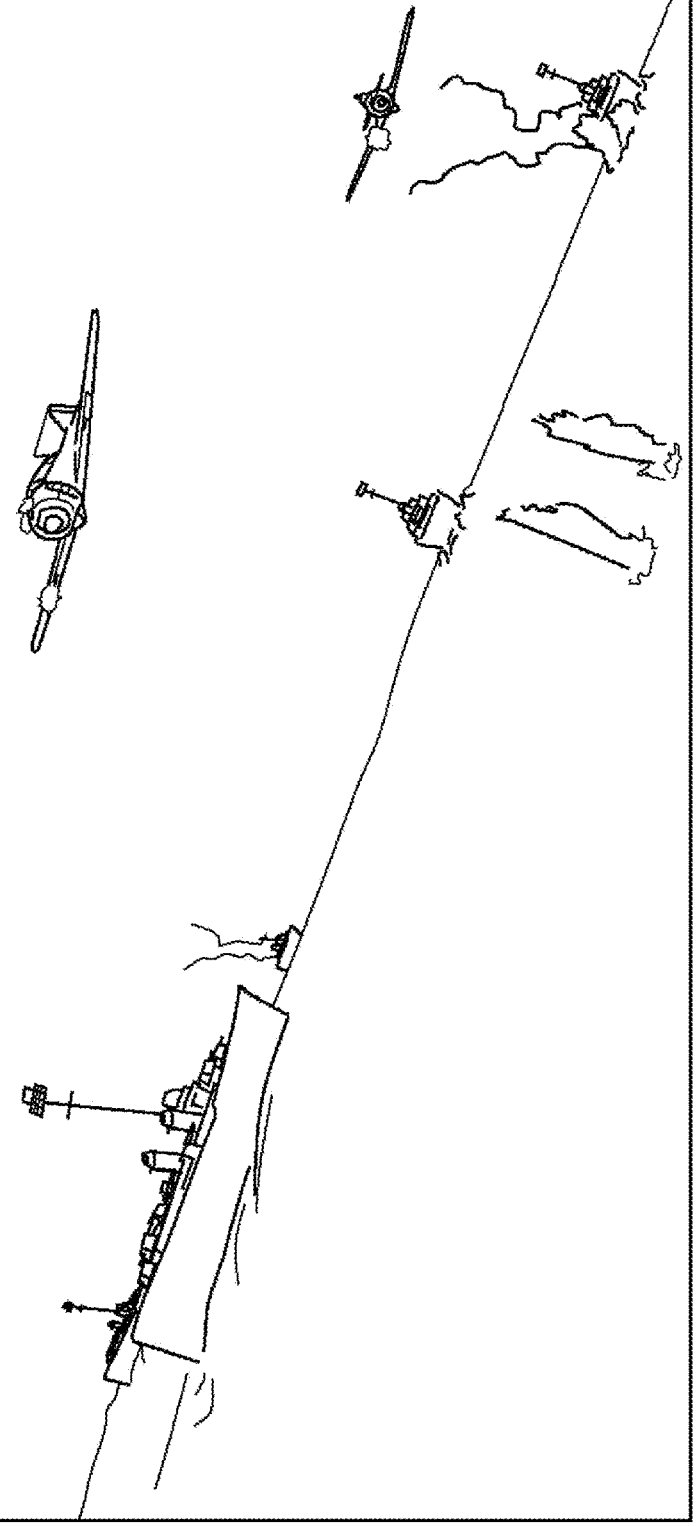
FIG. 9 is a diagram illustrating another example of the content selection image.

FIG. 9 illustrates another example of the content selection screen. In the content selection screen, the row of the icons has been shifted to the next position on the left from a state illustrated in FIG. 8, and the background image has been changed into a still image of the title "WarShip2." When the background image is changed, it is preferable that the system image generation unit 120 should give the rendering for increase in the concern of the user about the content by inserting a dynamic effect, instead of suddenly displaying the still image.

When the receiving unit 104 receives the icon changing manipulation, the system image generation unit 120 generates an image different from a still image of a piece of content corresponding to a selected icon, makes the output device 4 display the different image, and generates a moving image that are to change into the still image of the content after lapse of a predetermined time period from display of the different image. In this case, the system image generation unit 120 generates the image resulting from processing of the still image of "WarShip2" corresponding to the selected icon, makes the output device 4 display the image, and generates the moving image that are to be changed continuously in terms of time into the still image of "WarShip2" after the lapse of the predetermined time period from the display of the processed image.

When the receiving unit 104 receives the icon changing manipulation, the system image generation unit 120 identifies a luminance value of a first pixel in a still image (such as package image) of the content and generates the image, resulting from processing of the still image such that a second pixel at a distance corresponding to the identified luminance value is made to have a pixel value of the first pixel. Herein, the first pixel in the still image signifies each pixel in the still image, and the system image generation unit 120 therefore carries out this processing for all pixels in the still image. The system image generation unit 120 uses the still image as a base image to carry out the processing in which the pixel value of each pixel in the still image is used as the pixel value of a pixel at the distance corresponding to the luminance value. Different distances correspond to such luminance values. For instance, the distance may be increased on condition that the luminance value is relatively high, and the distance may be decreased on condition that the luminance value is relatively low. Thus, the brighter pixel value moves the more greatly when the processed image changes into the still image, so that an effect of movement of images is increased.

When the receiving unit 104 receives the icon changing manipulation, the system image generation unit 120 generates the different image such that the second pixel at the distance corresponding to the luminance value from the first pixel in the direction of arrangement of the icons is made to have the pixel value of the first pixel. The system image generation unit 120 may generate the moving image such that the pixel value of the second pixel may be sequentially set as pixel values of a plurality of pixels located between the second pixel and the first pixel during a predetermined time period after generation of the different image. Thus, rendering in which pixel values are moved continuously in terms of time is attained, so that a sense of anticipation for the content can be increased.

INDUSTRIAL APPLICABILITY

The present invention can be applied to fields in which an image is displayed.

REFERENCE SIGNS LIST

1: Information processing system
10: Information processing device
100: Processing unit
102: Communication unit
104: Receiving unit
106: Display control unit
108: Frame buffer
110: Game execution unit
112: Game image generation unit
114: Game audio generation unit
120: System image generation unit

The invention claimed is:

1. An information processing device comprising:
circuitry configured to
   generate a moving image of content;
   receive a displayed image changing request, including manipulation of an icon;
   acquire information regarding a frame image of the content upon reception of the changing request; and
   use the information regarding the frame image to generate an image that differs from the frame image,
wherein the circuitry generates the image that differs from the frame image by performing blur processing on the frame image,
when the manipulation of the icon is received, the circuitry identifies a luminance value of a first pixel in the frame image and generates a different image in which a second pixel at a distance corresponding to the identified luminance value is made to have a pixel value of the first pixel, and
the circuitry
arranges icons of a plurality of pieces of content along one direction in front of a background image in the different image, and
when the manipulation of the icon is received, generates the different image such that the second pixel at the distance away from the first pixel in the direction of arrangement of the icons is made to have the pixel value of the first pixel.

2. The information processing device according to claim 1, wherein the circuitry acquires information regarding an end frame image of the content or an image preceding the end frame image by a predetermined number of frames.

3. The information processing device according to claim 1, wherein the circuitry generates the background image.

4. The information processing device according to claim 3, wherein the circuitry places at least one menu item in front of the background image.

5. The information processing device according to claim 3, wherein the background image includes a moving image.

6. The information processing device according to claim 1, wherein the circuitry generates a moving image that links an end frame image of a first moving image and a start frame image of a second moving image in response to the changing request.

7. The information processing device according to claim 1, wherein the circuitry uses pixel information regarding the frame image to generate an image in accordance with an image generation program.

8. An information processing device comprising:
circuitry configured to
   generate a content selection image in which icons of a plurality of pieces of content are arranged so as to be selectable by a user and in which a still image of a piece of content corresponding to an icon being selected is used as a background image,
   receive an icon changing manipulation, and
   when the icon changing manipulation is received, generate an image different from a still image of a piece of content corresponding to a selected icon and generate a moving image that is to change into the still image after lapse of a predetermined time period from display of the different image,
wherein circuitry generates the moving image by performing blur processing on the still image,
when the icon changing manipulation is received, the circuitry identifies a luminance value of a first pixel in the still image and generates a different image in which a second pixel at a distance corresponding to the identified luminance value is made to have a pixel value of the first pixel, and
the circuitry
arranges icons of a plurality of pieces of content along one direction in front of the background image, and
when the icon changing manipulation is received, the generates the different image such that the second pixel at the distance away from the first pixel in the direction of arrangement of the icons is made to have the pixel value of the first pixel.

9. The information processing device according to claim 8, wherein the circuitry generates a moving image such that the pixel value of the second pixel is sequentially set as pixel values of a plurality of pixels located between the second pixel and the first pixel during a predetermined period.

10. An image generation method comprising:
generating a moving image of a piece of content;
receiving a displayed image changing request;
acquiring information regarding a frame image of the content upon reception of the changing request; and
using the information regarding the frame of the content to generate an image that differs from the frame image,
wherein the image that differs from the frame image is generated by performing blur processing on the frame image,
when the manipulation of the icon is received, a luminance value of a first pixel in the frame image is identified and a different image is generated in which a second pixel at a distance corresponding to the identified luminance value is made to have a pixel value of the first pixel, and
the method further comprises:
arranging icons of a plurality of pieces of content along one direction in front of a background image in the different image, and when the manipulation of the icon is received, generating the different image such that the second pixel at the distance away from the first pixel in the direction of arrangement of the icons is made to have the pixel value of the first pixel.

11. A non-transitory computer-readable medium storing a program that, when executed by a computer, causes the computer to perform a method comprising:
  generating a moving image of a piece of content;
  receiving a displayed image changing request;
  acquiring information regarding a frame image of the content upon reception of the changing request; and
  using the information regarding the frame image of the content to generate an image that differs from the frame image,
  wherein the image that differs from the frame image is generated by performing blur processing on the frame image,
  when the manipulation of the icon is received, a luminance value of a first pixel in the frame image is identified and a different image is generated in which a second pixel at a distance corresponding to the identified luminance value is made to have a pixel value of the first pixel, and
  the method further comprises:
  arranging icons of a plurality of pieces of content along one direction in front of a background image in the different image, and
  when the manipulation of the icon is received, generating the different image such that the second pixel at the distance away from the first pixel in the direction of arrangement of the icons is made to have the pixel value of the first pixel.

12. An image generation method comprising:
  generating a content selection image in which icons of a plurality of pieces of content are arranged so as to be selectable by a user and in which a still image of a piece of content corresponding to an icon being selected is used as a background image;
  receiving an icon changing manipulation;
  generating an image different from a still image of a content corresponding to a selected icon upon reception of the icon changing manipulation; and
  generating a moving image that is to change into the still image after lapse of a predetermined time period from display of the different image,
  wherein moving image is generated by performing blur processing on the still image,
  when the icon changing manipulation is received, a luminance value of a first pixel in the still image is identified and a different image is generated in which a second pixel at a distance corresponding to the identified luminance value is made to have a pixel value of the first pixel, and
  the method further comprises:
  arranging icons of a plurality of pieces of content along one direction in front of the background image, and
  when the icon changing manipulation is received, generating the different image such that the second pixel at the distance away from the first pixel in the direction of arrangement of the icons is made to have the pixel value of the first pixel.

13. A non-transitory computer-readable medium storing a program that, when executed by a computer, causes the computer to perform a method comprising:
  generating a content selection image in which icons of a plurality of pieces of content are arranged so as to be selectable by a user and in which a still image of a piece of content corresponding to an icon being selected is used as a background image;
  receiving an icon changing manipulation;
  generating an image different from a still image of a content corresponding to a selected icon upon reception of the icon changing manipulation; and
  generating a moving image that is to change into the still image after lapse of a predetermined time period from display of the different image,
  wherein moving image is generated by performing blur processing on the still image,
  when the icon changing manipulation is received, a luminance value of a first pixel in the still image is identified and a different image is generated in which a second pixel at a distance corresponding to the identified luminance value is made to have a pixel value of the first pixel, and
  the method further comprises:
  arranging icons of a plurality of pieces of content along one direction in front of the background image, and
  when the icon changing manipulation is received, generating the different image such that the second pixel at the distance away from the first pixel in the direction of arrangement of the icons is made to have the pixel value of the first pixel.

14. The information processing device according to claim 1, wherein the content is a game.

15. The information processing device according to claim 14, wherein the game is a first person shooter (FPS) game.

16. The information processing device according to claim 1, wherein the moving image, the frame image, and the image that differs from the frame image are displayed on a head mounted display.

17. The information processing device according to claim 3, wherein the background image includes a polka dot image including polka dots of different sizes.

* * * * *